(12) United States Patent
Petit

(10) Patent No.: US 11,050,290 B2
(45) Date of Patent: Jun. 29, 2021

(54) METHOD AND SYSTEM FOR THE ENERGY MANAGEMENT OF A SUPERCAPACITOR BY MEANS OF AN AGING MODEL AND OF SWELL PREDICTION

(71) Applicant: IFP Energies nouvelles, Rueil-Malmaison (FR)

(72) Inventor: Martin Petit, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 334 days.

(21) Appl. No.: 16/328,051

(22) PCT Filed: Jul. 11, 2017

(86) PCT No.: PCT/EP2017/067355
§ 371 (c)(1),
(2) Date: Feb. 25, 2019

(87) PCT Pub. No.: WO2018/036711
PCT Pub. Date: Mar. 1, 2018

(65) Prior Publication Data
US 2019/0199122 A1 Jun. 27, 2019

(30) Foreign Application Priority Data

Aug. 24, 2016 (FR) .................................. 16/57.898

(51) Int. Cl.
*H02J 7/00* (2006.01)
*H02J 7/34* (2006.01)
*E21B 19/09* (2006.01)

(52) U.S. Cl.
CPC .............. *H02J 7/345* (2013.01); *E21B 19/09* (2013.01)

(58) Field of Classification Search
CPC ....................................................... H02J 7/345
(Continued)

(56) References Cited

U.S. PATENT DOCUMENTS 7,602,146 B2 * 10/2009 Carrier ................ H01M 10/441
320/120
9,780,567 B2 * 10/2017 Hunt ......................... H02J 3/26
(Continued)

FOREIGN PATENT DOCUMENTS

EP           2268537 A2    1/2011
WO      2013/096128 A1    6/2013
(Continued)

OTHER PUBLICATIONS

International Search Report for PCT/EP2017/067355, dated Sep. 11, 2017; English translation submitted herewith (5 pgs.)

*Primary Examiner* — Yalkew Fantu
(74) *Attorney, Agent, or Firm* — Fitch, Even, Tabin & Flannery LLP

(57) ABSTRACT

The present invention is a method and a system for the energy management of an energy storage of an electrical system. The electrical system comprises at least one element (EMO) which moves under the action of swell, a means for driving the mobile means, and an energy storage. The energy storage means includes at least one supercapacitor. According to the invention, the energy management of the supercapacitor is controlled by determining ageing of the at least one supercapacitor beforehand used an ageing model of the at least one supercapacitor and a prediction of its future demand based on an estimate of future swell (HOU).
The invention also relates to a wave energy system and a heave compensator having such an energy management system.

15 Claims, 6 Drawing Sheets

(58) Field of Classification Search
USPC .......................................................... 320/167
See application file for complete search history.

(56) References Cited

U.S. PATENT DOCUMENTS

| | | | | |
|---|---|---|---|---|
| 2009/0189445 A1* | 7/2009 | Strizki | ...................... | H02J 7/34 |
| | | | | 307/21 |
| 2010/0094574 A1* | 4/2010 | He | ........................... | H02J 3/00 |
| | | | | 702/62 |
| 2013/0197707 A1* | 8/2013 | Keily | ...................... | G06F 1/263 |
| | | | | 700/295 |
| 2017/0267105 A1* | 9/2017 | Fratelli | ..................... | B60L 7/12 |
| 2018/0266195 A1 | 9/2018 | Odru et al. | | |

FOREIGN PATENT DOCUMENTS

| | | |
|---|---|---|
| WO | 2015/133896 A1 | 9/2015 |
| WO | 2016/087171 A1 | 6/2016 |

* cited by examiner

METHOD AND SYSTEM FOR THE ENERGY MANAGEMENT OF A SUPERCAPACITOR BY MEANS OF AN AGING MODEL AND OF SWELL PREDICTION

CROSS REFERENCE TO RELATED APPLICATIONS

Reference is made to PCT/EP2017/067355 filed Jul. 11, 2017, and French Application No. 16/57.898 filed Aug. 24, 2016, which are incorporated herein by reference in their entirety.

BACKGROUND OF THE INVENTION

Field of the Invention

The present invention relates to energy management of an energy storage of an electrical system, comprising at least one supercapacitor. The present invention may be applied in particular to the field of wave energy systems, or to the field of heave compensators.

Description of the Prior Art

The use of a supercapacitor pack as a reversible energy and electrical power source and store is growing in mobile or static applications that involve high power over relatively short times (of the order of a second). Specifically, a supercapacitor is characterized by a power density that may reach several tens of kW/kg, in contrast to accumulators that have a power density of just a few hundred W/kg. A supercapacitor is also characterized by excellent cyclability (generally greater than one million cycles as opposed to a few thousand for accumulators). For this reason, supercapacitors are electricity storage technologies that are preferred in marine energy recovery applications, as swell induces a pseudo-periodic cycling demand on the supercapacitors, this being characterized by short periods and potentially highly variable powers.

Among the applications contemplated for marine energy recovery, French patent application FR 3029712 relates to the electrification of a heave compensator for offshore drilling, with a technical solution that is able to integrate supercapacitors for the reversible storage of electrical energy, which allows marine energy to be recovered.

In the offshore operation of an electrified system embedding electricity storage by way of supercapacitors and allowing marine energy to be recovered, the electric motor alternately performs sending of the power recovered by way of swell movement to the supercapacitor pack (charging) and draws power from the supercapacitor pack (discharging) in order for the electrified system to operate. In such applications, the power stored and produced by the supercapacitor pack may be high, on the order of a MW, thereby requiring suitable voltage and current levels. The packs are conventionally formed of modules that are connected in one of series and parallel with one another. Each module is formed with supercapacitor cells that are themselves connected in at least one of series and parallel. The architecture is studied in order to meet the application specifications.

A first technical problem that arises is that of increasing the energy efficiency of the electrified system for recovering marine energy. Depending on the state of charge of the supercapacitor pack, which determines the power and energy that are available or acceptable in the pack, the required power or the returned power will be directed to the storage system but not necessarily drawn or taken in. Specifically, if the storage system is not able to receive power (state of charge too high), the power is dissipated and the recovered marine energy is lost. In addition, if the storage system is not able to supply the power (state of charge too low), the electrical power necessary for the electrified system to operate correctly is supplied by an external power supply. However, from the point of view of the supercapacitor, the energy is missing.

A second technical problem is associated with the ageing of supercapacitors that is observed by those skilled in the art in the case of long-term use, even during normal usage. Specifically, physicochemical and mechanical phenomena gradually lead to irreversible degradation of the internal components of supercapacitors. This causes a reduction in storage capacity, which affects the energy of supercapacitors, and leads to an increase in internal resistance, which is reflected in a loss of power of the supercapacitors. The phenomenology and the kinetics of the ageing depend in particular on the type of internal components, but also on the environmental conditions (temperature) and on the conditions in which the storage system is used (in particular on the voltage and on the average current level).

In order to meet the technical and functional specifications of the electrified system for recovering marine energy, as well as industrial cost requirements, the supercapacitor pack should not lose energy recovered through swell, the missing energy should be minimal, the size of the pack should be as small as possible and the lifetime should be as long as possible (in other words, the supercapacitor pack should have limited ageing).

A method and a device for optimizing the use of the system for storing electricity by way of supercapacitors for recovering marine energy, while at the same time preserving the lifetime of the system, therefore are necessary.

Various uses for these supercapacitors have been developed. However, they do not solve all of the problems outlined above.

For example, patent application WO 2013/096128 describes a pneumatical electrical hybrid system for suspending a riser, for exploiting deep-sea oil, and which makes it possible to compensate the heave of swell on the riser. The pneumatic-hydraulic storage system and the system for storing electricity using supercapacitors to recover a portion of the swell energy by a mechanical device and use it in the swell heave compensator. The energy management presented in patent application WO 2013/096128 provides passive management of the state of the storage systems by directing the energy to the electricity grid or to the storage system, depending on the state of charge or power of the storage systems. However, the states of swell are not taken into account. In addition, the problem of preserving the storage systems with respect to their ageing is not taken into account.

Another example is described in patent EP 2268537 B1, which describes an electrical device and a method for the active compensation of the heave linked to swell, which is applicable to any floating system that needs to be stable in a marine environment. The electrical energy is stored by using a supercapacitor pack or battery pack or a pack formed of a combination of supercapacitors and batteries. This storage system embedded in the floating system recovers a portion of the swell energy by way of a mechanical device (motor/generator) and uses it in the swell heave compensator. The swell heave compensator may also be supplied with power from the local electricity grid. In patent EP 2268537 B1, the energy flows are managed based on the state of the sea at the floating system. Local measurements of swell make it possible to evaluate the amount of marine or electrical energy to be used to compensate the heave. Thereafter, the energy management system compares the voltage of the electricity storage system with its operating voltage limits. If the voltage is too low, the energy management system draws the electricity originating from the electricity grid in order to compensate for heave, and will recover the swell energy in order to recharge the storage system. If the voltage is intermediate, the energy management system will preferably use the electrical energy from the storage system and will store the energy recovered through swell. If, lastly, the voltage of the storage system reaches its upper limit, the energy management system will dissipate the excess energy recovered through swell and uses the electrical energy from the storage system. Here again, the problem of preserving the storage systems with respect to their ageing is not taken into account.

It is observed that a device does not exist for optimizing, on the basis of the short-term demand, the average charge of a supercapacitor pack used in a system based on the recovery of (marine) energy, in order simultaneously to optimize the energy efficiency of the system and the lifetime of the supercapacitors.

SUMMARY OF THE INVENTION

To mitigate these drawbacks, the present invention is a method and a system for the energy management of an energy storage of an electrical system. The electrical system comprises at least one element which moves under the action of swell, a means for driving the at least one element, and an energy storage. The energy storage means includes at least one supercapacitor. According to the invention, the energy management of the supercapacitor is controlled by determining the ageing of the supercapacitor beforehand by way of an ageing model and a prediction of its future demand on the basis of an estimate of future swell. It is thus possible to predictively optimize the efficiency of the electrical system, while at the same time harnessing the ageing of the supercapacitor.

The invention relates to a method for the energy management of an energy storage of an electrical system. The electrical system includes at least one mobile element, at least one means for electrically driving said mobile element, and at least one electrical energy storage for supplying or recovering electrical energy to or from the means for electrical driving. The mobile element is subjected to swell, and the storage comprising at least one supercapacitor. For this method, an ageing model of the supercapacitor is constructed, the which links the ageing of the supercapacitor with a demand on the supercapacitor. The following steps are performed:
  a) determining a state of future swell;
  b) deducing, from the state of future swell, a future demand on the supercapacitor by the driving means;
  c) determining the ageing of the supercapacitor by use of the ageing model and of the demand on the supercapacitor; and
  d) controlling the energy of the supercapacitor of the energy storage based on the ageing of the supercapacitor.

According to one embodiment of the invention, the state of future swell is determined by way at least one of weather data, sensors and a swell estimation method.

Advantageously, the ageing model of the supercapacitor is determined by way of an Eyring law or by way of a Kovaltchouk model.

According to one implementation, the energy management of the supercapacitor is chosen from among charging the supercapacitor from at least one of an electricity grid and an electrical battery, discharging the supercapacitor into an electricity grid and into an electrical battery and into a dissipative component.

According to one feature, the energy management of the supercapacitor is determined by comparing the state of charge of the supercapacitor with at least one state of charge target, the state of charge target of the supercapacitor is defined by way of the ageing of the supercapacitor.

Advantageously, the energy management is determined by implementing the following steps:
  a) determining the future target average state of charge $SOC_{obj}$, of the supercapacitor based on ageing;
  b) comparing a target state of charge $SOC_{obj}$, with an actual state of charge $SOC_{ucap}$ of the supercapacitor; and
  c) based on the comparison, charging or discharging the supercapacitor as follows:
    i) if the actual state of charge is higher than the target state of charge, then discharging the supercapacitor; and
    ii) if the actual state of charge is lower than the target state of charge, then charging the supercapacitor.

The invention additionally relates to a system for the energy management of an energy storage in an electrical system, the electrical system including at least one mobile element, at least one driver for electrically driving the mobile element, and at least one electrical energy storage for supplying or recovering electrical energy to or from the driver, the mobile element being subjected to swells, and the storage comprising at least one supercapacitor. The management system comprises means for determining a state of future swells, means for determining the future demand on the supercapacitor by the driver, means for determining ageing of the supercapacitor using an ageing model of the supercapacitor and of the demand on the supercapacitor, and a control for controlling the energy management of the supercapacitor based on ageing of the supercapacitor, the ageing model of the supercapacitor linking ageing of the supercapacitor with the demand.

According to one embodiment, the means for determining a state of future swells includes at least one of weather data analysis, sensors and swell estimation means.

According to one implementation, the ageing model of the supercapacitor is determined by use of Eyring's law or by use of a Kovaltchouk model.

According to one implementation option, the supercapacitor is connected to at least one of an electricity grid and an electrical battery, the control for controlling the electrical energy management controls at least one of charging and the discharging of the supercapacitor from or at least one of the electricity grid and the electrical battery.

According to one implementation variant, the control comprises means for comparing a state of charge of the supercapacitor with at least one state of charge target, the state of charge target of the supercapacitor being defined by use of the ageing of the supercapacitor.

Furthermore, the invention relates to a wave energy system for converting swell energy into electrical energy, the wave energy system comprising a mobile means, an electrical conversion machine, and an electrical energy storage including at least one supercapacitor. The wave energy system includes an energy management system in accordance with one of the previous features.

The invention also relates to a heave compensator for drilling tools tethered to an offshore mobile installation, comprising an electrical driver and an electrical energy storage including at least one supercapacitor. The heave compensator includes an energy management system in accordance with one of the previous features.

BRIEF DESCRIPTION OF THE DRAWINGS

Other features and advantages of the method and of the system according to the invention will become apparent upon reading the following description of nonlimiting exemplary embodiments with reference to the appended figures described below.

DETAILED DESCRIPTION OF THE INVENTION

Figure 1:
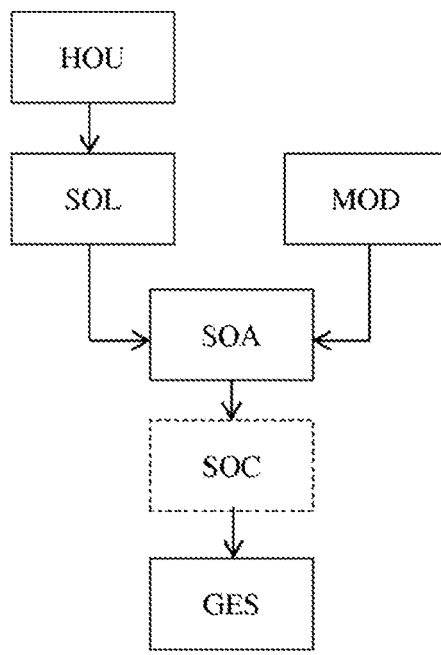
FIG. 1 illustrates the steps of the method according to one embodiment of the invention.

The present invention relates to a method and a system for the energy management of a storage of an electrical system (electrified system). The electrical system make possible recovery of marine energy, which is swell energy. To this end, the electrical system includes at least:
- a mobile element subjected to swells: which is the movement of the mobile element influenced by the swells;
- an electrical driver which is the electrical driver for driving the mobile element which may be reversible; it may be a motor in order to move the mobile element and it may be a generator when the mobile element is subjected to a movement (in particular linked to swells); the electrical driver may be an electrical machine; and
- an electrical energy storage for supplying (returning) or recovering electrical energy to or from the electrical driver. Thus, when the driver is a motor, the electrical energy storage supplies (returns) electrical energy to the driver, and when the driver is a generator, the electrical energy storage recovers electrical energy generated by the driver.

According to the invention, the electrical energy storage includes at least one supercapacitor. The electrical energy storage may preferably include a plurality of supercapacitors combined to form of a module or a pack. For example, a supercapacitor pack may be formed from a plurality of modules, which are connected in at least one of series and in parallel with one another, and each module may be formed from unit cells (supercapacitors) that are themselves connected in one of series and parallel.

It is noted that a supercapacitor is characterized by a power density that may reach tens of kW/kg; which in contrast, accumulators have a power density of just a few hundred W/kg. A supercapacitor is also characterized by excellent cyclability (generally greater than one million cycles as opposed to a few thousand for accumulators). For this reason, supercapacitors are electricity storage technologies that are preferred in marine energy recovery applications, as swell induces a pseudo-periodic cycling demand on the supercapacitors, which is characterized by short periods and potentially highly variable powers.

It is also noted that supercapacitors are electricity storage systems based on two electrodes that are separated by a porous dielectric film, called a separator and impregnated with an electrolyte. In contrast to batteries, the principle for the electrical storage of energy is not based on electrochemical conversion but on electrostatic interaction at the electrode/electrolyte interface, called electric double layer. The electrostatic process based only on the movement of ions between two electrodes is much faster than the electrochemical process, which requires a phase change. The charging/discharging times are therefore much faster for supercapacitors (on the order of a second) than for batteries (time constant of the order of an hour). Supercapacitors are thus characterized by a high power density but a low energy density.

Figure 3:
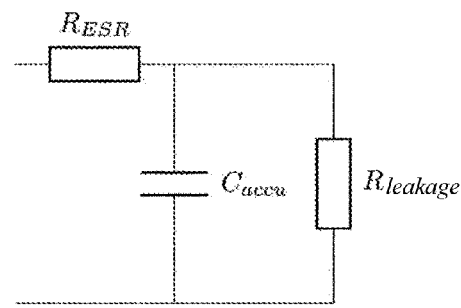
FIG. 3 is an equivalent circuit diagram that models a supercapacitor.

This system may be represented simply as a resistor RESR in series with a capacitor Caccu, which is itself in parallel with a leakage resistor Rleakage. FIG. 3 illustrates such a model.

In the remainder of the description and for the claims, the terms waves, tides and swell are considered to be equivalent.

The method according to the invention includes the following steps:
1) Determining the future swell,
2) Determining the future demand on the supercapacitor,
3) Constructing the ageing model of the supercapacitor,
4) Determining the ageing of the supercapacitor, and
5) Managing the energy.

Step 3) of constructing the ageing model of the supercapacitor may be performed before, after or steps 1) and 2).

The method according to the invention uses information supplied by an alert system (swell determination) to decide on the energy management strategy for the supercapacitors in order to improve the operation of the electrical system for recovering marine energy, in terms of efficiency and of ageing of the supercapacitor.

FIG. 1 illustrates, schematically and without limitation, the method according to the invention with five steps, and with an optional step of determining the state of charge of the supercapacitor. Thus, the embodiment of FIG. 1 includes the following steps:
1) Determining the future swell (HOU),
2) Determining the future demand (SOL) on the supercapacitor, 3) Constructing the ageing model (MOD) of the supercapacitor,
4) Determining the ageing (SOA) of the supercapacitor,
4') (optional) Determining the state of charge (SOC) of the supercapacitor, and
5) Managing (GES) the energy.

1) Determining the Future Swell

This step involves predicting the state of the future swell (also called the swell order of magnitude), at least in the short term, at the location of the mobile means. State of swell is the name given to the macroscopic features of swell, which are in particular the amplitude and the frequency of the swell. Short term is the name given to a time corresponding substantially to around ten periods of the swell.

According to one embodiment of the invention, the future swell may be calculated by virtue of weather data for the region in which the electrical system is installed. These data may be continuously transmitted to an energy management system that, with knowledge of the previously established correlation between weather data and swells, is then able to use this in order to deduce the future profiles of the swells that will be encountered by the mobile element.

As an alternative, an array of sensors may be installed around the installation site of the electrical system, which measures the states of the swells in order to evaluate the states of upcoming swell at the installation site of the electrical system in the short term (for example in the next few minutes). In the same way as above, these data may be continuously transmitted to an energy management system that is then able to use them in order to deduce from them the future profiles of the swells that will be encountered by the mobile element.

According to one implementation variant, the swell determination may be implemented by way of a swell estimation method, for example using the method described in the patent application number FR 1560260, which uses an autoregressive swell model.

2) Determining the Future Demand on the Supercapacitor

In this step, the future demand (at least in the short term) on the supercapacitor is determined (predicted). This determination is implemented on the basis of the prediction of the state of future swells performed in the previous step. On the basis of the future swells, it is thus determined whether energy should be provided to or recovered from the driver by the supercapacitor. For this step, the behavior of the driver of the electrical system is taken into account. To this end, it is possible to use a model of the driver and of the mobile element that links the state of swell with the demands on the supercapacitor.

The demand on the supercapacitor may in particular relate to the voltage and the current flowing therein.

3) Constructing the Ageing Model of the Supercapacitor

In this step, an ageing model of the supercapacitor is constructed. The ageing model of the supercapacitor links the ageing of the supercapacitor with its demand. The ageing of the supercapacitor denotes the variation (the degradation) of the physical features of the components of the supercapacitor as it is used over time. Ageing may have various causes. The ageing is correlated with the lifetime of the supercapacitor. The ageing model may take into account use parameters of the supercapacitor, such as temperature, cycling, etc. These parameters are dependent on the demands on the supercapacitor (voltage, current, etc.).

Moreover these considerations which are linked to the requirements in terms of power, may also relate lifetime to operating conditions. The gradual degradation of supercapacitors is reflected in a drop in performance in terms of power and in terms of energy, in association with a rise in the internal resistance and a drop in capacitance of one or of both electrodes. The main factors that promote ageing, which are known in the art regardless of the supercapacitor technology, are high voltage, high temperature and a high average current.

According to one embodiment of the invention, the ageing model SOA (state of ageing) of the supercapacitor may be determined using application of the Eyring law, which makes it possible to determine the damage caused by the ageing factors with respect to a reference state defined by the relationship(temperature Tref, voltage Vref and zero current):

$$\frac{dSOA}{dt} = \frac{1}{T_{life}^{ref}} \exp\left(\frac{T - T_{ref}}{T_0}\right)\left(\exp\left(\frac{V - V_{ref}}{V_0}\right) + K\right) \exp\left(k_{RMS} \frac{I_{RMS}}{C_{accu}^0}\right)$$

In this relationship, $T_{life}^{ref}$ is the characteristic time of ageing at the temperature $T_{ref}$ (in ° C.), at the voltage $V_{ref}$ (in V) and at zero effective current $I_{RMS}$ (root mean square, RMS). T is the temperature of the supercapacitor, $T_0$ is an adjustment temperature (in K), $V_0$ (in V) is an adjustment voltage, $k_{RMS}$ is an adjustment parameter describing the effect of cycling on the ageing (in s/V) and $C_{accu}^0$ is the initial capacitance of the cell (in F). $T_{life}^{ref}$ corresponding to the nominal lifetime of the supercapacitor at the voltage $V_{ref}$ and at the temperature $T_{ref}$. The temperature T of the supercapacitor is determined through measurement (this measurement is generally performed for supercapacitor packs for safety reasons).

According to one alternative, the ageing model of the supercapacitor may be determined by way of a Kovaltchouk model. This model is described in particular in the document Kovaltchouk, T.; Multon, B.; Ben Ahmed, H.; Aubry, J.; Venet, P. Enhanced Aging Model for Supercapacitors Taking into Account Power Cycling: Application to the Sizing of an Energy Storage System in a Direct Wave Energy Converter: In, 2014; pp 1-10.

4) Determining the Ageing of the Supercapacitor

In this step, the future ageing of the supercapacitor is determined (or else predicted), in the short term, by way of the ageing model of the supercapacitor determined in the previous step, and by way of the demand on the supercapacitor determined in step 2).

According to one embodiment of the invention, the ageing model of the supercapacitor may be applied to the voltage, to the current and to the temperature that were determined in step 2).

The ageing determined in this step therefore corresponds to the ageing of the supercapacitor, which is dependent on the state of upcoming swells.

5) Managing the Energy

In this step, the energy management of the supercapacitor is determined and then controlled on the basis of the ageing of the supercapacitor. Energy management that makes it possible to return or recover electrical energy to or from the driver (with minimal energy losses) in an optimum manner, while at the same time limiting the ageing of the supercapacitor, is thus determined. Controlling the energy management may consist in charging or discharging the electrical energy to or from the supercapacitor. Controlling the energy management then applies the determined management to the supercapacitor.

In this case, determining the state of the future swells makes it possible to predict the height of the waves arriving at the location of the electrified system, and therefore to anticipate the amplitude of the power demands required (in pseudo-periodic cycling) from the energy storage system. It is thus possible to calculate an optimum energy distribution for increasing energy efficiency and limiting the ageing of the supercapacitors, with knowledge of the order of magnitude of the (taken-in and supplied) future powers that the supercapacitor storage system will "see". Advantageously, energy may be distributed between supercapacitors and an electricity grid by an energy manager.

According to one embodiment of the invention, the electrical energy storage (which comprises the supercapacitor) may be connected to an electrical grid. As an alternative or in addition, the electrical energy storage may comprise at least one electrical battery, for example a lithium-ion battery. This battery may be connected to the supercapacitor and then serve as a buffer storage system. As an alternative or in addition, the supercapacitor may be connected to an electrical energy-dissipating component, for example an electrical resistor. This solution is inexpensive but leads to an energy loss.

For these implementation options, the energy management may charge the supercapacitor from at least one of the electrical grid and from an electrical battery. It is thus possible to recharge the supercapacitor to its optimum state of charge. The energy management may also discharge the supercapacitor into at least one of the electrical grid and into the electrical battery and into the electrical energy-dissipating component. Discharging makes it possible to dissipate surplus energy.

According to one embodiment, the energy management may be determined by solving the following problem for calculating the optimum voltage U:

$$\min_{U} \frac{dSOA}{dt} \Bigg/ \begin{cases} P_{available} \geq P_{supplied} \\ E_{available} \geq E_{supplied} \\ I_{RMS} \leq I_{max}^{RMS} \end{cases}$$

where SOA is the ageing of the supercapacitor, U is the optimum voltage of the supercapacitor, $I_{max}^{RMS}$ is the maximum effective current, $P_{available}$ is the power available in the supercapacitor, $P_{supplied}$ is the power required by the system, $E_{available}$ is the energy available in the supercapacitor, and $E_{supplied}$ is the energy necessary for the system to operate. For this determination, consideration may be given to the model of the supercapacitor illustrated in FIG. 3.

According to one implementation of the invention, determining the energy management may take into account operating constraints of the supercapacitor. Specifically, to ensure that supercapacitors are safe and have a long operating life, supercapacitor manufacturers define operating limits that should not be exceeded. Thus, to avoid overcharging the cell, a maximum operating voltage is given, and a minimum voltage is sometimes also indicated. In addition, to limit heating, a maximum root mean square (RMS) average effective current is recommended, which limits heating to about forty degrees. For example, in the case of the Maxwell 3000F® (Maxwell, USA) cylindrical supercapacitor, the limits imposed by the manufacturer are indicated in table 1. This table thus gives two maximum voltage values as well as two maximum current values. The highest values correspond to tolerances for a one-off usage that should not be repeated and that should be limited in terms of duration.

TABLE 1

| Constraints of the Maxwell 3000F ® supercapacitor | |
|---|---|
| Constraints | Values |
| Max voltage | 2.7 V |
| Max instantaneous voltage | 2.85 V |
| Max current | 1900 A |
| Max average effective current | 210 A |

According to one embodiment of the invention, to determine the energy management, it is possible to implement the following steps, based on the determination of the future demands on the storage system:

a) determining a voltage U of the supercapacitor that minimizes the variation in the ageing of the supercapacitor, based on the future demand determined in the previous step, while at the same time meeting the requirements of the system (energy, power and current), and then the average state of charge SOC of the supercapacitor is determined from this which is the average state of charge most suited to the state of swell. This future state of charge is defined as a target state of charge $SOC^{obj}$ for the supercapacitor, b) comparing the target state of charge $SOC^{obj}$ with the actual state of charge $SOC^{ucap}$ given by the voltage of the supercapacitors; and c) based on the comparison, charging or discharging the supercapacitor for example from at least one of the electrical grid and an electrical battery and a dissipative component:
  i) if the actual state of charge is higher than the target state of charge ($SOC^{obj}$>$SOC^{ucap}$), then discharging the supercapacitor, and
  ii) if the actual state of charge is lower than the target state of charge ($SOC^{obj}$>$SOC^{ucap}$), then charging the supercapacitor.

The present invention furthermore relates to a system for the energy management of an electrical energy storage system. The energy management system implements the energy management method in accordance with one of the embodiments described above, or in accordance with any one of the combinations of the embodiments described above.

According to the invention, the management system comprises at least:
  means for determining a state of future swell (that is to say a swell order of magnitude);
  means for determining the future demand on the supercapacitor by the driving means, which takes into account the state of future swell;
  means for determining the ageing of the supercapacitor by use of an ageing model of the supercapacitor and of the future demand on the supercapacitor; and
  means for controlling the energy management of the supercapacitor based on the ageing of the supercapacitor with the ageing model of the supercapacitor linking the ageing of the supercapacitor with its demand.

Figure 2:
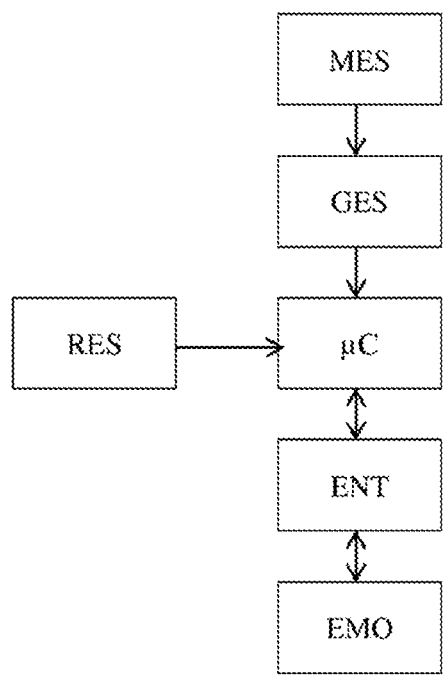
FIG. 2 illustrates an electrical system comprising an energy management system according to one embodiment of the invention.

FIG. 2 illustrates, schematically and without limitation, an electrical system comprising an energy management system according to one embodiment of the invention. The electrical system includes at least:

- means for determining a state of swell MES;
- an energy management system GES that receives the state of swell originating from the means for determining a state of swell MES;
- at least one supercapacitor μC with the energy management system controlling the energy returned and recovered by the supercapacitor μC;
- optionally, the supercapacitor μC may be connected to an electrical grid RES for at least one of charging, discharging, and to an electrical battery (not shown) and to a dissipative electrical component (not shown);
- a driving means ENT that is connected to the supercapacitor μC, for recovering or returning energy; and
- a mobile element EMO, which is driven by the driver and which is subjected to swell.

According to one embodiment of the invention, the means for determining the state of future swell may include at least one of weather data analysis, and sensors, and swell estimation means. The means for determining a state of swell may be able to implement one of the variants of step 1) described above.

According to one implementation variant, the ageing model of the supercapacitor may be determined by way of application of Eyring's law, a Kovaltchouk model, or any other analogous model. In particular, the ageing model may be in accordance with the example described in step 3) of the method according to the invention.

According to one implementation option, the electrical energy storage may include an electrical battery. As an alternative or in addition, the electrical energy storage may be connected to an electrical grid. As an alternative or in addition, the electrical energy storage means may be connected to a dissipative electrical component, for example an electrical resistor. The means for controlling (control) the energy management may control the charging of the supercapacitor from at least one of the electrical grid and the electrical battery. In addition, the control for controlling the energy management may control the discharging of the supercapacitor into at least one of the electrical grid and into the electrical battery and into the dissipative electrical component.

According to one embodiment of the invention, the means for controlling the energy management may comprise means for comparing the state of charge of the supercapacitor with a state of charge target of the supercapacitor with the state of charge target of the supercapacitor being defined by use of the determined ageing. The control may be in accordance with the exemplary embodiment described in step 5) of the method according to the invention.

The method and the system according to the invention are particularly suitable for a wave energy system and for a heave compensator.

A wave energy system makes it possible to convert swell energy into another type of energy, for example mechanical or electrical energy. A wave energy system also generally includes a mobile element, also called a pendulum or a float, which exhibits an oscillating movement under the action of swell. The mobile element/means interacts with a conversion machine (driving element or means), also called power take-off (PTO) system, which more often than not includes an electrical generator coupled to a device for adjusting the transmission of the oscillating movement, in order to convert the movement of the mobile element/means into recoverable energy. In some cases, the conversion machine may act as a motor by generating a force on the mobile element/means. Specifically, to recover power via the conversion machine, a torque or a force that resists the movement of the mobile is produced (generator mode). By contrast, if the conversion machine allows, it is possible to supply power to the conversion machine to supply a torque or a force that drives the mobile element/means to assist making itself resonate with the waves (motor mode).

According to the invention, the conversion machine is an electrical machine, and the wave energy system furthermore includes an electrical energy storage/means for returning and recovering energy to and from the electrical machine. This electrical energy storage/means advantageously includes at least one supercapacitor. The energy of the electrical energy storage/means is managed in accordance with at least one of the energy management method and system according to the invention.

The wave energy system according to the invention is suitable for any type of wave energy system having at least one mobile element/means, for example those described in patent application FR 2973448 (U.S. Pat. No. 9,261,070). The energy management method according to the invention may also be applied to a wave energy system belonging to the category of wave energy systems having oscillating water columns (OWC).

Figure 9:
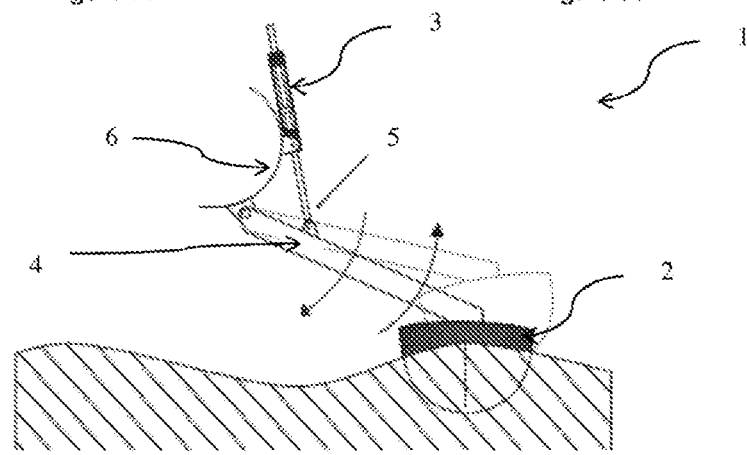
FIG. 9 illustrates a wave energy system according to one embodiment of the invention.

FIG. 9 schematically illustrates one nonlimiting example of a wave energy system 1. The wave energy system 1 includes a mobile element/means 2 that floats (swell is shown schematically by the hatched area). The mobile element/means 2 interacts, by way of a lever arm 4, with a conversion machine based on an electrical generator 3, which is a linear generator in this case. The lever arm 4 and the electrical generator are articulated with respect to an installation 6. The movements of the lever arm are shown schematically by arrows.

The invention also relates to a heave compensator equipped with at least one electrical actuation system. The heave compensator makes it possible to keep drilling tools at a constant tension during offshore drilling operations. Specifically, among other effects, swell causes heave, which is an oscillating vertical translational movement, for floating craft. When the craft are carrying tools, such as drilling tools, it is necessary to compensate for the heave so that the tool is always in contact with the bottom of the bore. The electrical actuation system includes in particular an electrical driver means for driving the mobile tools formed by the drilling tools, and includes an electrical energy storage system including at least one supercapacitor. The energy of the electrical energy storage system is managed in accordance with at least one of the energy management method and system according to the invention.

For example, the invention may be applied to the compensation system described in patent application FR 2575452 (U.S. Pat. No. 5,520,369), in which the hydraulic actuators and the accumulators are fully or partly replaced with an electrical actuation system. Specifically, the heave compensator described in that patent application, due to the use of hydraulic actuators, requires the presence of bulky and heavy accumulators. Fully or partly replacing these hydraulic actuators makes it possible to dispense with the accumulators or to reduce the size of the accumulators.

The heave compensator according to the invention includes:

- a first block, also called crown block, the first block being equipped with at least one pulley;

a second block, also called traveling block, to which the drilling tools are tethered, the second block being equipped with at least one pulley; the first and second blocks are preferably vertically aligned;

an articulated system comprising at least two articulated arms, preferably two or four symmetrically positioned arms, the articulated arms connecting the mobile installation to the first block, each articulated arm comprising at least one pulley;

a cable fixed to the mobile installation by a holding means and passing through the pulleys of the articulated arms and of the first and second blocks, the cable forming at least one loop around the first and second blocks; wherein the means for holding the cable on the mobile installation may comprise at least one winch for adjusting the length of the cable; and an electrical actuation system such as described above, one end of which is linked to the first block and the other end of which is linked to the mobile installation, in particular a floating platform or a vessel.

It is noted that a block is a mechanical device allowing a load to be lifted by way of a plurality of cable strands.

Heave-induced movement of the mobile installation is for the most part compensated by the movement of the first block with respect to the mobile installation. The second block is thus immobile with respect to a fixed reference frame, for example the seabed. The movement of the first block is controlled by the linear actuation system and is permitted by the articulated system.

Figure 10:
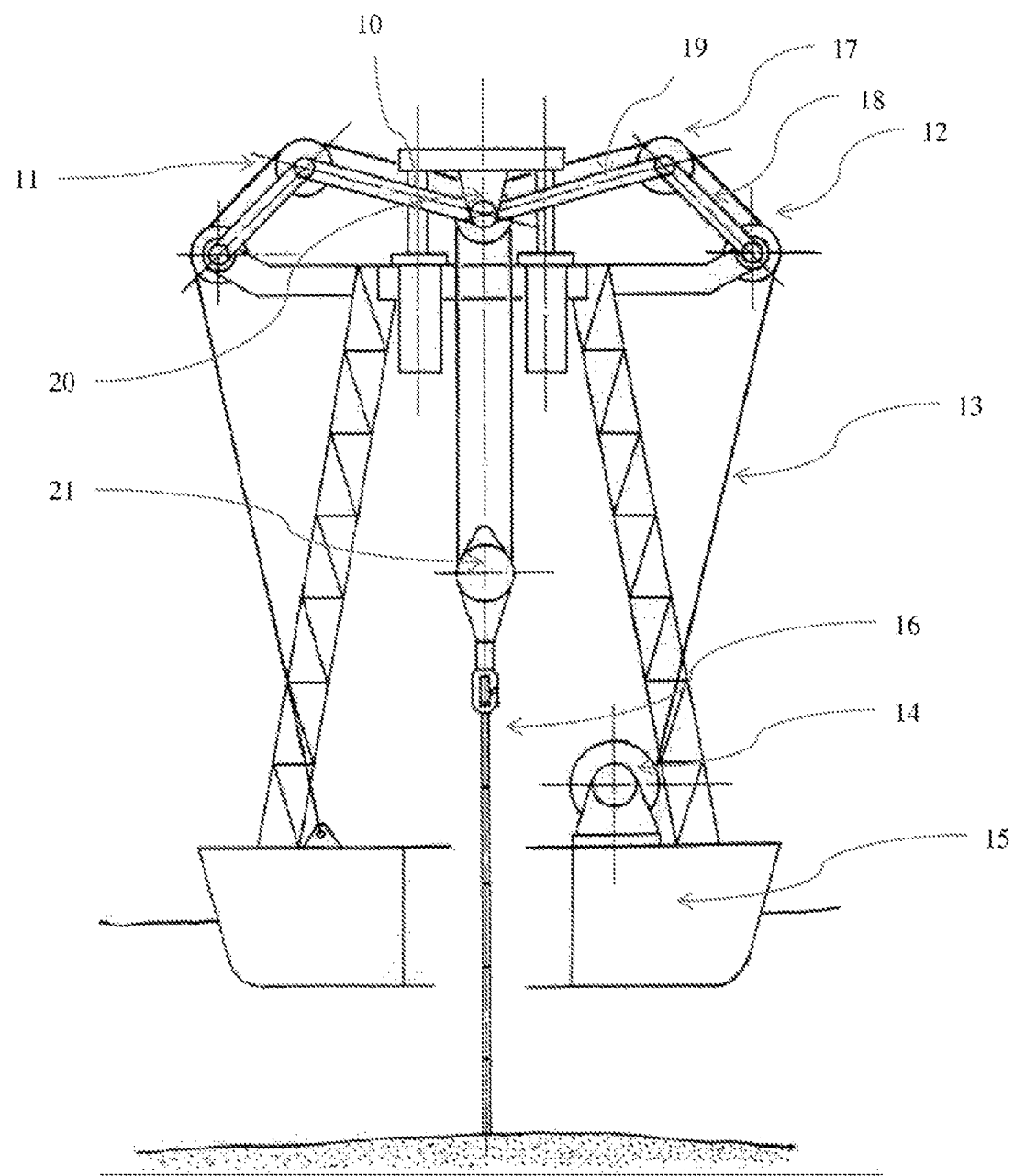
FIG. 10 illustrates a heave compensator according to one embodiment of the invention.

FIG. 10 shows a heave compensator according to one embodiment of the invention. The heave compensator is installed on an offshore mobile installation. The compensation system tethers an element 16 (for example drilling tools) to a second block 21 by way of a hook. The heave compensator furthermore includes a first block 20, two articulated arms 11 connected to a support 15 that is connected to the mobile installation, two electrical actuation systems 10 (the electrical energy storage/means and the electrical energy management system are not shown) and a cable 13 fixed by holding means 14, the cable 13 passing through the pulleys of the articulated arms 11 and through the first and second blocks 20 and 21. As shown, the first block 20, the second block 21 and the tethered element are vertically aligned, and the heave-induced movement to be compensated is a vertical movement.

As illustrated and without limitation, each articulated arm 11 includes an idler pulley 12 connected to the support 15 that is connected to the mobile installation, an intermediate pulley 17, a first rod 18 between the idler pulley 12 and the intermediate pulley 17 and a second rod 19 between the intermediate pulley 17 and the first block 8.

When the sea level is low, the rods of the electrical actuation systems 10 are completely extended and the first block 20 is farthest from the level of the mobile installation 15. In this position, the electric motor or motors of the electrical actuation system 10 are supplied with power by energy storage/means (not shown) such as described above, comprising at least one supercapacitor.

By contrast, when the sea level rises, the rods of the linear electrical actuation systems are completely retracted and the first block 20 is closest to the level of the mobile installation 15. In this position, the electric motor or motors of the electrical actuation systems 10 supply energy, which is stored in the energy storage/means.

In this case, with respect to the prior art of hydraulic actuators with their oleopneumatic reserves, all bulky and complex fluid circulation systems and all hydraulic leakage problems are avoided. In addition, the gain in terms of mass and volume linked to replacing oleopneumatic reserves with supercapacitors may be extremely significant, approaching one order of magnitude in favorable cases, which has significant repercussions on the bulk of the platform.

For this application, the electrical actuation system may be linear and may preferably comprise a roller screw, a plurality of AC asynchronous motors and supercapacitors. This design of the linear actuation system optimizes efficiency and reduces bulk and weight of the actuation system, thereby allowing simplified design of the mobile installation on which the heave compensator is situated.

One variant of this system may be obtained by adding an actuator that couples the crown block 20 and the traveling block 21 and that makes it possible to adjust the weight on the tool more precisely.

The electrical actuation system according to the invention may also be used directly, without the pulley system such as described in patent FR 2575452 (U.S. Pat. No. 5,520,369). In this case, it only that the load is held in position.

The energy management method and system according to the invention may also be used in a system for electrically driving a system for tensioning vertical pipes, such as risers, which form the vertical link between the seabed and the surface on floating drilling or oil production platforms.

Generally speaking, the energy management method and system according to the invention are generally applicable for any electrified system having an electrical storage such as supercapacitors for recovering marine energy.

Comparative Example

To demonstrate the advantages of the energy management method and system according to the invention, a comparative example is implemented for use in a heave compensator including an electrical driving system. When the electrical heave compensation system is operating, the electrical motor sends power recovered through the swell movement to the supercapacitor pack (charging) and draws power from the supercapacitor pack (discharging) in order to maintain the pressure on the drill strings and compensate the swell movement. In this application, the power stored and produced by the supercapacitor pack is of the order of a MW and requires very high voltage and current levels.

Figure 4:
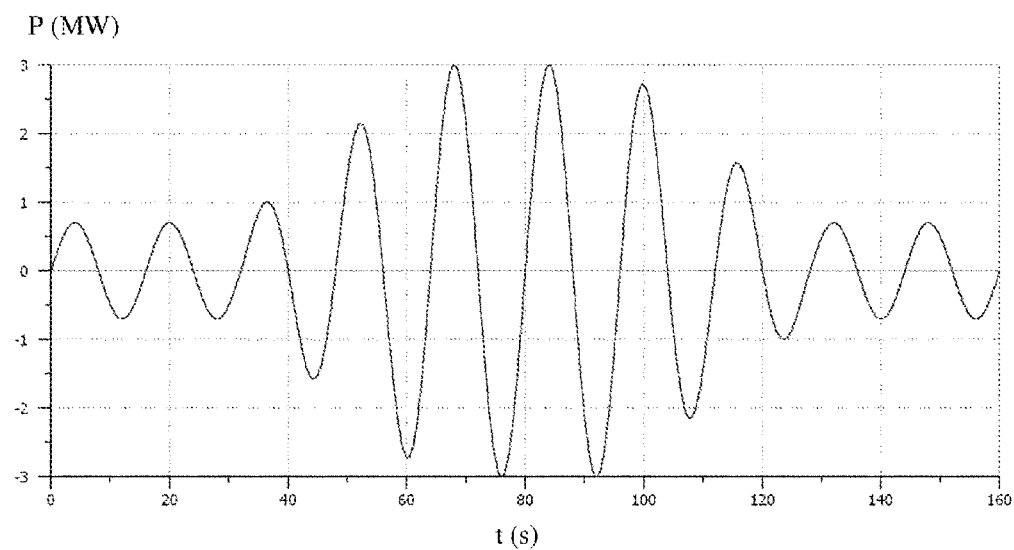
FIG. 4 illustrates the power required from the electrical system for one example.

This example illustrates the gain provided by the method and the system according to the invention. To this end, consideration is given to an initial state of swell that produces a demand on the heave compensator for a sinusoidal electric power with a period of 16 s and an amplitude of 0.7 MW. A larger series of waves then arrives, leading to a demand, which is still sinusoidal, with a period of 16 s but an amplitude of 3 MW. Once the series of waves has passed, the system returns to its initial state. The power P (MW) profile as a function of time t(s) of the state of swell under consideration is indicated in FIG. 4.

For this example, the pack is formed of supercapacitor cells of 3000 F connected in series and in parallel: 19 branches of 356 cells in series (denoted 356s19p). Their internal resistance is 0.29 m$\Omega$). The upper operating voltage is set at 2.7 V and the lower voltage at 0 V. Their ageing (SOA) is evaluated by virtue of the Kovaltchouk model (this model is described in the document Kovaltchouk, T.; Multon, B.; Ben Ahmed, H.; Aubry, J.; Venet, P. Enhanced Aging Model for Supercapacitors Taking into Account Power Cycling: Application to the Sizing of an Energy Storage System in a Direct Wave Energy Converter:. In, 2014; pp 1-10.).

Figure 5:
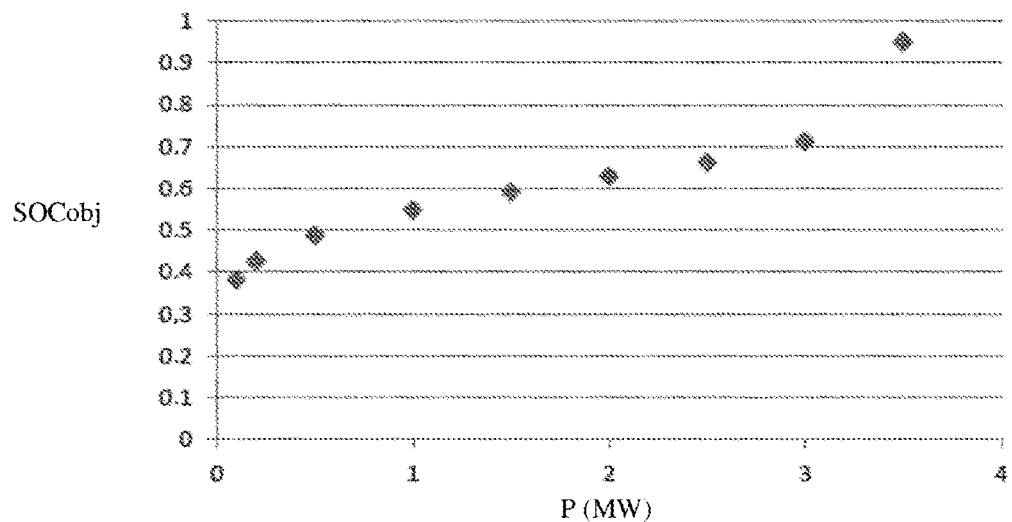
FIG. 5 shows a graph of the objective for the optimum average states of charge as a function of the supplied power for one example according to the invention.

In FIG. 5, the average target state of charge $SOC_{obj}$ is calculated based on the power required from the electrical system P (MW), so as to optimize both electrical performance and longevity of the pack. This state of charge is determined in accordance with the exemplary embodiment described in step 5) of the method according to the invention. To obtain this curve, the problem for determining the optimum voltage U that has been solved is as follows:

$$\min_{U} \frac{dSOA}{dt} \bigg/ \begin{cases} P_{available} \geq P_{supplied} \\ E_{available} \geq E_{supplied} \\ I_{RMS} \leq I_{max}^{RMS} \end{cases}$$

where SOA is the ageing of the supercapacitor, U is the optimum voltage of the supercapacitor, $I_{max}^{RMS}$ is the maximum effective current, $P_{available}$ is the power available in the supercapacitor, $P_{supplied}$ is the power required by the system, $E_{available}$ is the energy available in the supercapacitor, and $E_{supplied}$ is the energy necessary for the system to operate.

A scenario with a sinusoidal supplied power with a period of 16 s has been chosen here. In this specific case, according to this embodiment of the invention, the target state of charge $SOC_{obj}$ is low (<0.5) when swell is low, whereas, in the event of heavy weather, it is increased to allow an appropriate response of the storage system until the limits of the storage system are reached when there are excessively high power draws, making it necessary to set the target $SOC_{obj}$ close to the maximum SOC of 100%.

It may thus be noted that the management algorithm according to the invention recommends putting the supercapacitor pack at a high SOC, that is to say at a high voltage level, to limit its ageing. This is due to the low currents that result from the high voltage for providing the required power. What is thus obtained is a counter-intuitive recommendation that suggests giving preference to high states of charge to absorb high power requirements while limiting the current required from the cells.

Prior art case 1: the initial voltage is set at 1.3 V per cell
For this case, the voltage of each cell is arbitrarily set at 1.3 V.

Figure 6A:
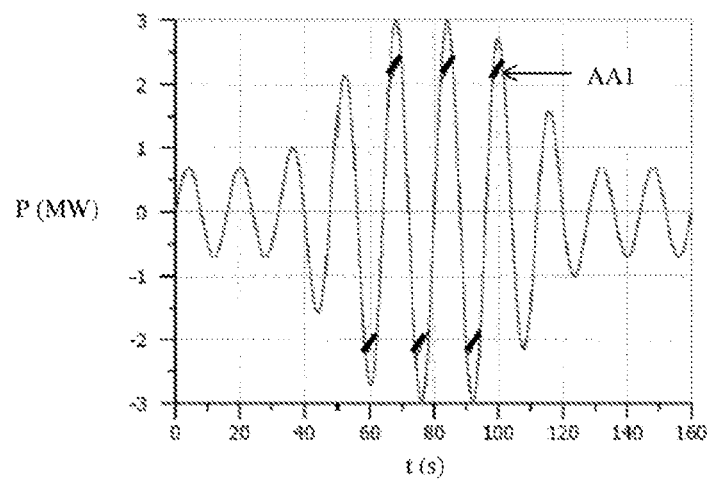
FIGS. 6a to 6c illustrate the required power, the energy during charging and the energy during discharging, respectively, according to a first comparative example from the prior art, as illustrated in FIG. 4.

FIG. 6a illustrates the power P(MW) required from the storage system denoted AA1 in comparison with the total power required from the electrical system (according to the curve illustrated in FIG. 4), as a function of time t(s). It is noted that the curves substantially overlap, except for the highest amplitudes where the power required from the storage system is less than the power required from the electrical system (cf. thick lines). In this figure, there is therefore a lack of power from the storage system, which is not capable of meeting the required demands. When the wave arrives, the power is too high and the voltage is too low. Due to this, the current needed to achieve the required power exceeds the maximum authorized current.

Figure 6B:
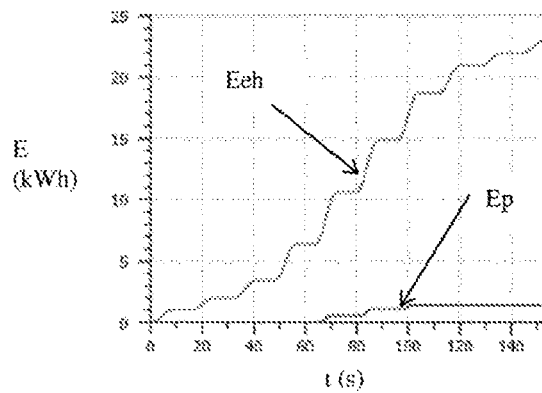
Figure 6C:
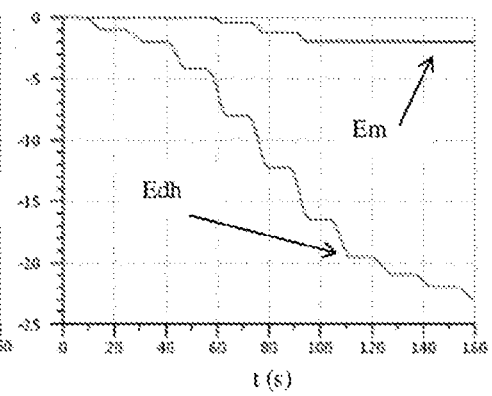

There is thus an energy loss during recharging, which corresponds to the difference between the energy sent to the electrical system and the energy sent to the electrical storage means. However, there is also missing energy during discharging, due to the current limit. These energy deficits are shown in FIGS. 6b and 6c. FIG. 6b illustrates the energy sent by the waves during charging Eeh, and the energy lost Ep during charging, as a function of time t(s). FIG. 6c illustrates the energy required from the storage system Edh during discharging, and the missing energy Em during discharging, as a function of time. In these figures, energy losses and missing energy are noted with this setting of the initial voltage of the voltage of the supercapacitor at 1.3 V (in accordance with the prior art).

It is also possible to observe the state of ageing obtained following this event. Taking the model described above as a basis, the ageing SOA that is reached constitutes the reference of our calculations and is considered to be 100.

Prior art case 2: the initial voltage is 2.6 V
For this case, the voltage of each cell is arbitrarily set at 2.6 V.

Figure 7A:
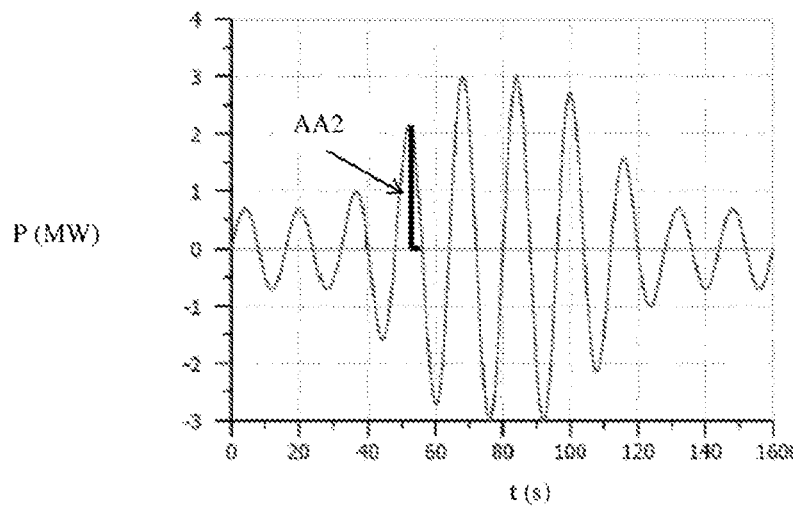
FIGS. 7a to 7c illustrate the required power, the energy during charging and the energy during discharging, respectively, according to a second comparative example from the prior art, as illustrated in FIG. 4.
Figure 7B:
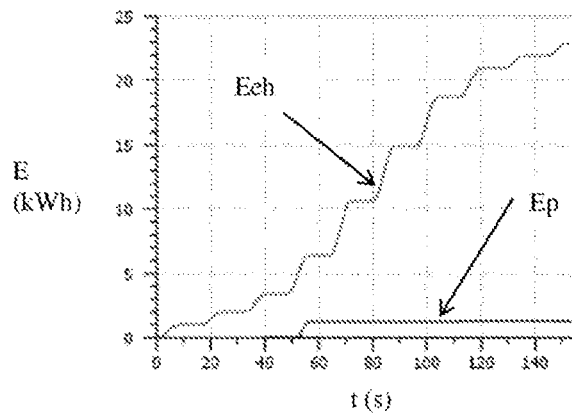
Figure 7C:
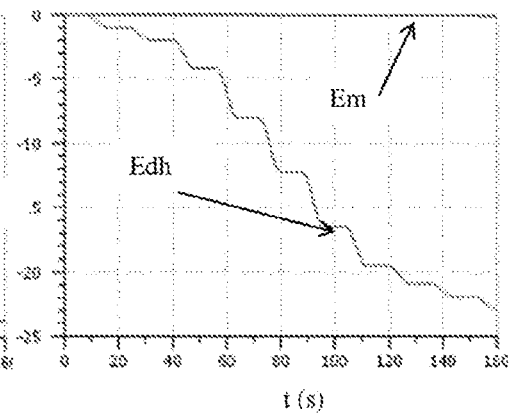

FIGS. 7a to 7c correspond to FIGS. 6a to 6c for prior art case 2 (denoted AA2).

In FIG. 7a, it is possible to see, around 50 s, that the power required from the storage system is lower than that required by the grid (cf. thick lines). This is due to the fact that the cell is excessively charged and that it is not capable of accepting any more energy. This is thus reflected in a minimum energy loss of the order of 1300 Wh (FIG. 7b). By contrast, the storage system in this case has no difficulty in supplying all of the energy that is required during discharging. This is visible in FIG. 7c.

With regard to the ageing, the ageing SOA reaches a value of 35.7 at the end of the event.

Optimized case according to the invention: the initial voltage is set at 2.28 V
By way of the method and of the system according to the invention, the optimum initial voltage (determined by managing the energy of the supercapacitor) is determined to be 2.28 V.

Figure 8A:
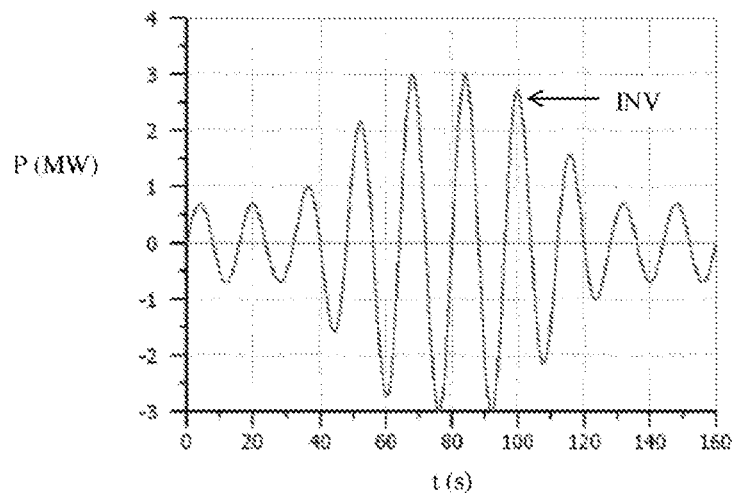
FIGS. 8a to 8c illustrate the required power, the energy during charging and the energy during discharging, respectively, according to one embodiment of the invention, as illustrated in FIG. 4.
Figure 8B:
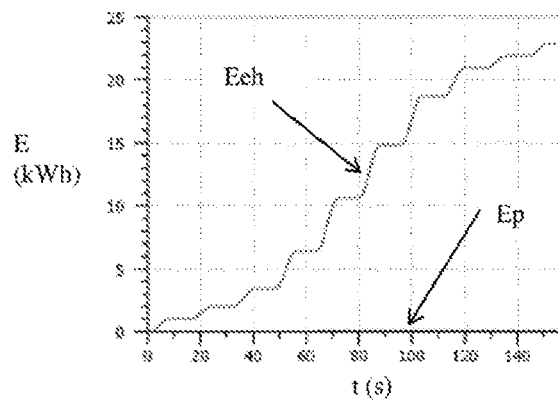
Figure 8C:
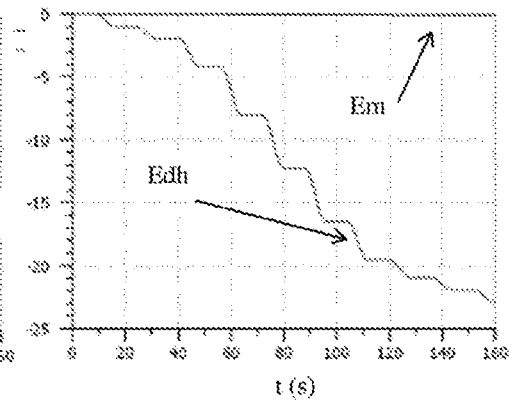

FIGS. 8a to 8c correspond to FIGS. 6a to 6c for the case according to the invention (denoted INV).

In FIG. 8a, it is possible to verify that, in the case of an optimized initial voltage that makes possible reduction of ageing while at the same time providing complete recovery of the energy and supplying all of the required energy. The storage system follows the energy requirements imposed on the electrical system and to store all of the energy sent to the electrical system. Specifically, in FIG. 8a, the two curves completely overlap. In the event studied, no lost energy (FIG. 8b) or missing energy (FIG. 8c) is observed.

With regard to the ageing, a value of 43.7 is achieved. This value is significantly lower than the ageing calculated for prior art case no. 1. However, this value is slightly higher than in the case of a higher initial voltage since the operating currents are slightly higher. However, this initial voltage value makes it possible to optimize energy recovery, and therefore the efficiency of the electrical system, which was not the case for the two examples from the prior art.

The invention claimed is:
1. A method for energy management of an energy storage of an electrical system, the electrical system including at least one mobile element, at least one means for electrically driving the at least one mobile element, and at least one electrical energy storage for supplying or recovering electrical energy to or from the at least one means for electrically driving, the at least one mobile element being subjected to swell, and the at least one electrical storage comprising at least one supercapacitor, an ageing model of the supercapacitor which links the state of ageing of the at least one supercapacitor with demand on the at least one supercapacitor, comprising:
 a) determining a state of future swell;
 b) deducing, from the determined state of future swell, a future demand on the at least one supercapacitor by the at least one means for electrically driving;

c) determining states of ageing of the at least one supercapacitor by use of ageing model and of the future demand on the at least one supercapacitor; and d) controlling the energy stored by the at least one supercapacitor of the energy storage based on the stage of ageing of the at least one supercapacitor.

2. The method as claimed in claim 1, wherein the state of future swell is determined from at least one of weather data, sensors and an estimation of swell method.

3. The method as claimed in claim 1, wherein the ageing model of the at least one supercapacitor is determined from at least one of an Eyring law and a Kovaltchouk model.

4. The method as claimed in claim 1, wherein the energy management of the at least one supercapacitor is chosen from among at least one charging the at least one supercapacitor from an electricity grid, an electrical battery, discharging the at least one supercapacitor into an electricity grid, an electrical battery and into a dissipative element.

5. The method as claimed in claim 1, wherein the energy management of the at least one supercapacitor is determined by comparing the state of charge of the at least one supercapacitor with at least one state of charge target, the state of charge target of the at least one supercapacitor being defined by the state of ageing of the at least one supercapacitor.

6. The method as claimed in claim 5, wherein the energy management is determined by:

a) determining a future target average state of charge of the at least one supercapacitor based on ageing of the at least one supercapacitor;

b) comparing the average target state of charge with an actual state of charge of the at least one supercapacitor; and c) based on comparing, charging or discharging the at least one supercapacitor so that:

i) if the actual state of charge is higher than the target state of charge, then discharging the at least one supercapacitor; and ii) if the actual state of charge is lower than the target state of charge, then charging the at least one supercapacitor.

7. A system for the energy management of an energy storage of an electrical system, the electrical system including at least one mobile element, at least one means for electrically driving the at least one mobile element, and at least one electrical energy storage for supplying or recovering electrical energy to or from the at least one means for electrically driving, the at least one mobile element being subjected to swell, and the electrical storage comprising at least one supercapacitor, wherein the energy management system comprises means for determining a state of future swell, means for determining a future demand on the at least one supercapacitor by the at least one means for driving, means for determining ageing of the at least one supercapacitor by use of an ageing model of the at least one supercapacitor and of the demand on the at least one supercapacitor, and means for controlling the energy management of the at least one supercapacitor based on of the ageing of the at least one supercapacitor, the ageing model of the at least one supercapacitor linking ageing of the at least one supercapacitor with the demand.

8. The system as claimed in claim 7, wherein the means for determining a state of future swell includes at least one of analysis of weather data, sensors, and means for estimating swell.

9. The system as claimed in claim 7, wherein the ageing model of the at least one supercapacitor is determined by use of at least one of an Eyring law and a Kovaltchouk model.

10. The system as claimed in claim 8, wherein the ageing model of the at least one supercapacitor is determined by use of at least one of an Eyring law and a Kovaltchouk model.

11. The system as claimed in claim 7, wherein, the at least one supercapacitor is connected to at least one of an electricity grid and an electrical battery and the means for controlling the electrical energy management controls the at least one charging and discharging of the at least one supercapacitor from or to at least one of an electric grid and the electrical battery.

12. The system as claimed in claim 9, wherein, the at least one supercapacitor is connected to at least one of an electricity grid and an electrical battery and the means for controlling the electrical energy management controls the at least one charging and discharging of the at least one supercapacitor from or to at least one of an electric grid and the electrical battery.

13. The system as claimed in claim 7, wherein the means for controlling energy management comprises means for comparing state of charge of the at least one supercapacitor with at least one state of charge target of the at least one supercapacitor, the at least one supercapacitor being defined by use of ageing of the at least one supercapacitor.

14. A wave energy system for converting swell energy into electrical energy, the wave energy system comprising at least one mobile element, an electrical conversion machine, and an electrical energy storage including at least one supercapacitor, wherein the wave energy system includes an energy management system as claimed in claim 7.

15. A heave compensator for drilling tools tethered to an offshore mobile installation, comprising means for electrically driving and an electrical energy storage including at least one supercapacitor, wherein the heave compensator includes an energy management system as claimed in claim 7.

* * * * *